United States Patent Office 3,743,642
Patented July 3, 1973

3,743,642
TRIAZINE DERIVATIVES
Matthias Schwarzmann, Limburgerhof, Guenther Gotsmann and Peter Heinze, Ludwigshafen, Ernst Heinrich Pommer, Limburgerhof, and Rudolf Mohr, Lampertheim, Germany, assignors to Badische Anilin- & Soda-Fabrik Aktiengesellschaft, Ludwigshafen (Rhine), Germany
No Drawing. Filed Apr. 2, 1971, Ser. No. 130,760
Int. Cl. C07d 55/22, 55/20
U.S. Cl. 260—249.6          3 Claims

ABSTRACT OF THE DISCLOSURE

New and valuable substituted triazine derivatives having a good fungicidal action and a process for controlling fungi with these compounds.

---

The present invention relates to new and valuable triazine derivatives having a good fungicidal action and fungicides containing these compounds.

It is known to use zinc ethylenebis(dithiocarbamate) (zineb) and tetramethylthiuram disulfide (TMTD) as fungicides. However, their action is not satisfactory.

We have now found that triazine derivatives of the formula

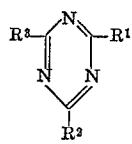

where $R^1$, $R^2$ and $R^3$ each denote N,N-dichloroamino or N,N-dibromoamino, $R^2$ and $R^3$ may also denote methyl, stearyl, phenyl, methoxy, chloro or the radical

A denoting ethyl, chloroethyl or hydrogen and B denoting ethyl or chloroethyl, have a good fungicidal action.

This action is particularly in evidence on fungi such as *Aspergillus niger*, and plant pathogenic fungi of the Phycomycetes class. The fungicides are therefore particularly suitable for protecting liquids and solids, e.g. adhesives, wax emulsions, drilling fluids, plastic dispersions or leather, against fungus attack, and for the protection of vines against attack by grape mildew (*Plasmopara viticola*).

When producing the new compounds, the following should be borne in mind:

As is the case with melamine, the direct chlorination in aqueous suspension in accordance with the equation R—NH$_2$+2Cl$_2$→R—NCl$_2$+2HCl (R=triazine radical)

causes considerable difficulties. The hydrochloric acid formed as a byproduct impedes the reaction. As the acid concentration increases, the back-reaction R—NHCl+HCl→R—NH$_2$+Cl$_2$ is promoted. Part of the amino-s-triazine is also converted by the hydrochloric acid formed into the hydrochloride which can only be chlorinated with difficulty. Furthermore, the reaction in an acetate-buffered acetic solution proceeds completely differently with some substituted amino-s-triazines. From acetoguanamine and chlorine or bromine under these conditions (M. Nencki, Chem. Ber., 9, 232, 1876; A. Ostrogovich, Bull. Soc. Bucarest, 14, 49, 1905) it is not 2-methyl-4,6-bis-dichloroamino-s-triazine which is formed, but, in accordance with

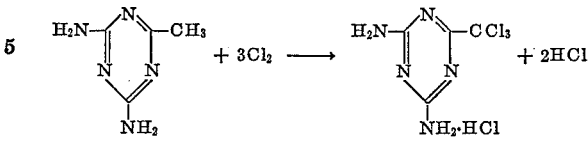

2-trichloromethyl-4,6-bis-amino-s-triazine hydrochloride.

Processes do exist which attempt to overcome the difficulties involved in the chlorination of melamine. Hexachloromelamine can be prepared most advantageously (German printed application 1,221,229) without the disadvantages mentioned above by reaction of chlorine with melamine in the presence of water when an aqueous suspension of melamine is reacted, in the presence of an amount—sufficient to dissolve the hexachloromelamine formed—of a solvent non-miscible with water, with chlorine while stirring and at a temperature of less than 60° C., the aqueous phase is separated, the hexachloromelamine is separated from the solution by cooling or by evaporating the solvent, and the mother liquor is returned if desired to the chlorination stage.

Similarly, it is possible to react substituted N,N-dichloroamino-s-triazines from substituted amino-s-triazines in aqueous solution with chlorine in the presence of an amount—sufficient to dissolve the mono or bis-N,N-dichloroamino-s-triazine formed—of an organic solvent non-miscible with water.

The reaction may be carried out, as is the case with melamine, at about 60° C. if the other radicals on the triazine nucleus, e.g. phenyl or stearyl, do not participate in the reaction. Employing 2-methyl-4,6-bis-amino-s-triazine, 2-chloro-4,6-bis-amino-s-triazine or 2-methoxy-4,6-bis-amino-s-triazine, it is advantageous not to chlorinate above 30° C. to 40° C. Using 2,4-bis-chloro-6-amino-s-triazine as starting material it is necessary to carry out the reaction at 0° to 10° C. to prevent hydrolytic cracking. The most favorable chlorination temperatures may easily be determined by experimentation; they are dependent on the stability of the remaining radicals on the triazine ring to chlorine; the pH of the solution; and the solubility of the chlorinated amino-s-triazines in the organic solvent.

Suitable solvents are chlorinated saturated and unsaturated hydrocarbons, particularly chloroform, carbon tetrachloride, dichloroethane, trichloroethane, tetrachloroethane, pentachloroethane, trichloroethylene, tetrachloroethylene and mixtures thereof.

These solvents have an excellent, strongly temperature-dependent solvency for most mono- or bis-dichloroamino-s-triazines; the advantage of this is that the solvents may simultaneously be used for recrystallizing the desired products.

The advantage of the process resides in the easy accessibility of very pure reaction products. As the amino-s-triazines used as starting materials and the N-chloroamino-s-triazines primarily formed are generally difficultly soluble, the N,N-dichloroamino-s-triazines on the other hand easily soluble, in the solvents non-miscible with water, the course of the reaction can be accurately observed and in most cases the very pure reaction product isolated from the organic phase.

Chlorination can be effected either by passing in chlorine gas or by continuous or batch addition of a saturated solution of chlorine in the said solvents. It is of course possible to use the mother liquors saturated at low temperatures with chlorine as chlorinating agents. In these cases, the chlorine is used in at least equivalent amounts, advantageously in an excess.

In addition to these processes for the preparation of chloromelamines, analogous syntheses for the production of the bromine and iodine compounds are known.

The bromination of melamine has been investigated in organic solvents and in aqueous suspension: N-bromo derivatives having 2 to 6 bromine atoms (U.S. Pats. Nos. 2,184,888 and 2,472,361) are obtained.

In another process (British Pat. No. 933,531), hexabromomelamine is obtained by allowing bromine to act on melamine suspended in an aqueous alkaline solution and introducing chlorine, alkali hypochlorite or hexachloromelamine into the reaction mixture.

As in the chlorination of an amino-s-triazine, there is formed in the bromination of an amino-s-triazine in accordance with $$R\text{---}NH_2 + 2Br_2 \rightarrow R\text{---}NBr_2 + 2HBr$$

(R = triazine radical)

a halogen hydracid which impedes the reaction and promotes the back-reaction as the acid concentration increases.

This difficulty can be overcome by employing, as described above, a two-phase system, e.g., carbon tetrachloride/water, or by removing with bases, e.g., sodium hydrogen carbonate, the halogen hydracid formed in the reaction from the mixture.

Some of the N,N-dibromoamino-s-triazines according to the invention are not soluble in carbon tetrachloride, chloroform, methylene chloride, dichloroethane, trichloroethane, tetrachloroethane, pentachloroethane, etc. to the same extent as the N,N-dichloroamino-s-triazines described above. For this reason the N-bromo compounds according to the invention were prepared by brominating the suspended amino-s-triazines with bromine in aqueous alkaline solution.

The amino-s-triazine suspended in 5 to 25 times the amount of water was brominated at 0° to 50° C. with the equivalent amount of bromine or an excess of up to 100% thereof with the adidtion of the equivalent amount of sodium hydrogen carbonate.

The ligand R has a direct influence on the degree of bromination of the triazines as a result of the—in comparison to chlorine—low reactivity of bromine.

Kretov and Davydow (Chim. geterocikl. Soed., No. 6, 1965, 934–938) describe the bromination of 4,6-diamino-s-triazines substituted in 2-position by electrophilic radicals such as $CF_3$, $CHF_2$, $CH_2F$, $CHFCl$, $CF_2Cl$ and $CFCl_2$; only with difficulty do they obtain monobromoaminotriazine and 2-trifluoromethyl-4-dibromoamino-6-bromo-amino-s-triazine as the only dibromoamino-s-triazine in 6% yield.

It has been found that the bromination of aminotriazines is impeded by electrophilic radicals such as Cl and yields monobromoamino-s-triazines.

The bromination of amino-s-triazines to dibromoamino-s-triazines is, however, facilitated by electron donors as ligands, e.g., alkyl, aryl, alkoxy, alkylamino, dialkylamino, etc., as they increase the basicity of the nucleus and consequently the electron density on the nitrogen atom of the amino group.

The following new N,N-dihaloamino-s-triazine compounds are listed by way of example:

(1) 2,4-bis-(N,N-dichloroamino)-6-methyl-s-triazine
(2) 2,4-bis-(N,N-dichloroamino)-6-phenyl-s-triazine
(3) 2,4-bis-(N,N-dichloroamino)-6-stearyl-s-triazine
(4) 2,4-bis-(N,N-dichloroamino)-6-methoxy-s-triazine
(5) 2,4-bis-(N,N-dichloroamino)-6-chloro-s-triazine
(6) 2-(N,N-dichloroamino)-4,6-bis-phenyl-s-triazine
(7) 2-(N,N-dichloroamino)-4,6-bis-chloro-s-triazine
(8) 2-(N,N-dichloroamino)-4-(N-chloroethylamino)-6-chloro-s-triazine
(9) 2,4-bis-(N,N-dibromoamino)-6-methyl-s-triazine
(10) 2,4-bis(N,N-dibromoamino)-6-methoxy-s-triazine
(11) 2-(N,N-dibromoamino)-4-chloro-6-ethylamino-s-triazine
(12) 2-(N,N-dibromoamino)-4-chloro-6-diethylamino-s-triazine
(13) 2-(N,N-dibromoamino)-4,6-bis(methoxy)-s-triazine
(14) 2,4,6-tris-(N,N-dibromoamino)-s-triazine.

The parts in the examples below are by weight.

EXAMPLE 1

1.25 parts of acetoguanamine is suspended in a mixture of 700 parts of carbon tetrachloride and 700 parts of water. At 25° to 30° C., 1 liter per minute of chlorine gas is passed into this mixture while stirring. After 10 to 20 minutes the acetoguanamine is chlorinated and is in the carbon tetrachloride phase. The clear aqueous phase, in which the hydrogen chloride is dissolved, is separated and replaced by the same amount of fresh water, and chlorine gas is again passed in. This procedure is repeated twice; a total of 37.5 parts (0.3 mole) of acetoguanamine is reacted.

Upon conclusion of the reaction, the aqueous layers are united and extracted twice, each time with 100 parts of carbon tetrachloride. All the carbon tetrachloride phases are united and concentrated in vacuo (14 mm. Hg). 78 parts (99% of theory, with reference to acetoguanamine used) of 2,4-bis-(N,N-dichloroamino)-6-methyl-s-triazine ($C_4H_3Cl_4N_5$) is obtained in the form of pale yellow crystalline needles. The product melts at 73° to 74° C. and contains 53.8% (theory: 54.2%) of active chlorine.

EXAMPLE 2

10 parts of benzoguanamine is suspended in 800 parts of carbon tetrachloride and 700 parts of water. At 35° to 45° C. and while stirring, 1 liter per minute of chlorine gas is passed into this mixture. After a few minutes the already celar aqueous phase in which the hydrogen chloride is dissolved is separated, replaced by the same amount of fresh water and new benzoguanamine, and again chloinated. The procedure is repeated until a total of 50 parts of benzoguanamine has been reacted. The carbon tetrachloride solution is separated and cooled to —25° C.; the 2,4-bis-(N,N-dichloroamino)-6-phenyl-s-triazine $$(C_9H_5Cl_4N_5)$$

which has crystallized out is filtered off and dried. 49.6 parts of yellow crystals with a melting point of 135° C. is obtained.

A further 24.1 parts of crystals is obtained by removing the solvent. The total yield is therefore 73.7 parts (84.9% of the theory); the product contains 43% (theory: 43.7%) of active chlorine.

EXAMPLE 3

30 parts of stereoguanamine is suspended in 1,000 parts of carbon tetrachloride and 1,000 parts of water. As described in Example 1, chlorine gas is passed into this mixture while stirring and at 25° to 35° C. After a few minutes the aqueous phase is replaced, 30 parts of stereoguanamine is added and the mixture is again chlorinated. The procedure is repeated until a total of 150 parts of stereoguanamine has been reacted. After the carbon tetrachloride solution has been separated, the solvent is withdrawn in vacuo. 204 parts (99% of theory) of 2,4-bis(N,N-dichloroamino)-6-heptadecyl-s-triazine ($C_{20}H_{35}Cl_4N_5$) is obtained as a crystalline substance having a melting point of 45° to 46° C. (active chlorine: calc. 56.2%; found: 56.4%).

EXAMPLE 4

As described in the foregoing examples, 100 parts of 2-methoxy-4,6-bis-amino-s-triazine is chlorinated in small amounts and at 40° to 50° C. in a mixture of 700 parts of carbon tetrachloride and 700 parts of water; the aqueous phase containing hydrogen chloride is renewed five times. About half the solvent is withdrawn from the carbon tetrachloride solution. At −40° C., 190 parts (96% of theory) of 2,4-bis(N,N-dichloroamino)-6-methoxy-s-triazine $(C_4H_3Cl_4ON_5)$ is obtained as a crystalline yellow product melting at 86° to 87° C. (active chlorine: calc.: 50.9%; found: 51.0%).

EXAMPLE 5

As described in Example 1, 100 parts of 2-chloro-4,6-amino-s-triazine is chlorinated in small amounts and at 30° to 40° C. in a mixture of 700 parts of carbon tetrachloride and 700 parts of water. About half the solvent is withdrawn, and at −30° C. 161 parts (82.7% of theory) of 2,4-bis-(N,N-dichloroamino)-6-chloro-s-triazine $(C_3H_5Cl_5)$ 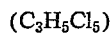

is obtained as yellow crystals melting at 119° to 120° C. (active chlorine: calc.: 50.1%; found: 50.4%).

EXAMPLE 6

49.6 parts of 2-amino-4,6-bis-phenyl-s-triazine is chlorinated in small amounts and at 20° to 30° C. in a mixture of 700 parts of carbon tetrachloride and 700 parts of water. The solvent is removed in vacuo and from the carbon tetrachloride solution there is obtained 60 parts (95% of theory) of 2-(N,N-dichloroamino)-4,6-bis-phenyl-s-triazine ($C_{15}H_{10}Cl_2N_4$) as a colorless crystalline product melting at 136° C. (active chlorine: calc.: 22.4%; found: 23.3%).

EXAMPLE 7

224 parts of freshly produced 2,4-bis-chloro-6-amino-s-triazine is suspended, in small amounts, in 1,000 parts of carbon tetrachloride and 1,000 parts of water, and the suspension chlorinated at room temperature. After about ⅔ of the solvent has been removed, there is obtained from the carbon tetrachloride solution at −20° to −30° C. 267 parts (84.2% of theory) of 2-(N,N-dichloroamino)-4,6-bis-chloro-s-triazine ($C_3Cl_4N_4$) as a yellow crystalline product melting at 88° to 89° C. (active chlorine: calc.: 30.4%; found: 30.8%).

EXAMPLE 8

122 parts of 2-chloroethylamino-6-amino-s-triazine is suspended in small portions in 700 parts of carbon tetrachloride and 700 parts of water; the supension is chlorinated at room temperature. The solvent is removed in vacuo and there is obtained from the carbon tetrachloride solution 161 parts (82.5% of theory) of 2-(N,N-dichloroamino)-4-(N-chloroethylamino)-6-chloro-s-triazine $(C_5H_5Cl_4N_5)$ as a yellow crystalline product melting at 63° to 65° C.
Active chlorine: calc.: 38.4%; found: 36.9%; total chlorine: calc.: 51.3%; found: 50.6%.

EXAMPLE 9

25 parts of 2-methyl-4,6-diamino-s-triazine is suspended in a solution of 67.2 parts of sodium hydrogen carbonate in 500 parts of water. While stirring vigorously, 140 parts of bromine is added at 0° to 5° C., a large amount of carbon dioxide being evolved. The mixture is stirred for 16 hours at 25° C. and the product is washed free from bromide and dried. 60 parts (68.2% of theory) of a reddish yellow substance ($C_4H_3Br_4N_5$) is obtained which contains 71.2% of active bromine (theory: 71.4%) and which melts with decomposition at 105° C.

EXAMPLE 10

7.05 parts of 2-methoxy-4,6-diamino-s-triazine is suspended in a solution of 16.8 parts of sodium hydrogen carbonate in 250 parts of water. At 20° C., 35 parts of bromine is added. The mixture is stirred for 6 hours and the solid is suction filtered and dried. After recrystallization from carbon tetrachloride, 15 parts (66.8% of theory) of a yellow substance ($C_4H_3Br_4N_5O$) is obtained which contains 66.6% of active bromine (theory: 69.9%) and which melts at 117° C.

EXAMPLE 11

17.4 parts of 2-chloro-4-ethylamino-6-amino-s-triazine is suspended, and 16.8 parts of sodium hydrogen carbonate dissolved, in 200 parts of water. Slowly and while stirring, 34 g. (0.21 mole) of bromine is added and the whole stirred for 14 hours after completion of the reaction. After the product has been worked up, 33.2 parts (100% of theory) of a reddish yellow substance $(C_5H_6Br_2ClN_5)$ 

is obtained which contains 46.5% of active bromine (theory: 48.2%) and which melts at 83° C.

EXAMPLE 12

40.3 parts of 2-chloro-4-diethylamino-6-amino-s-triazine is suspended, and 33.6 parts of sodium hydrogen carbonate is dissolved, in 500 parts of water. Slowly and while stirring, 70 parts of bromine is added at 0° C., and the whole is stirred for an hour at 0° C. and for a further 13 hours at 20° C. with methylene chloride, 48 parts (67% of theory) of a reddish yellow substance ($C_7H_{10}Br_2ClN_5$) which crystallizes poorly is dissolved out of the product.

EXAMPLE 13

46.8 parts of 2,4-bis-(methoxy)-6-amino-s-triazine is suspended in a solution of 50.4 parts of sodium hydrogen carbonate in 500 parts of water. At from 0° to 50° C., 95.9 parts of bromine is added and the whole is stirred for 15 hours. The reaction product is suction filtered, washed free from bromide and dried.

80 parts (85% of theory) of a yellow crystalline substance ($C_5H_6Br_2N_4O_2$) is obtained which can be recrystallized from carbon tetrachloride. The product contains 47.1% of active bromine (theory: 51%) and melts at 129° C.

EXAMPLE 14

12.6 parts of 2,4,6-tris-amino-s-triazine is suspended in a solution of 50.4 parts of sodium hydrogen carbonate in 300 parts of water. At 20° C. and while stirring vigorously, 95.9 parts of bromine is added, a large amount of carbon dioxide being evolved. After stirring for 12 hours, the product is suction filtered, washed free from bromide and dried.

51 parts (85% of theory) of a reddish yellow substance  ($C_3Br_3N_6$) is obtained which contains 80% of active bromine (theory: 80%) and which melts with decomposition above 130° C.

The agents according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C., e.g., tetrahydronaphthalene and alkylated naphthalenes, or organic liquids having boiling points higher than 150° C. and one or more than one functional group, e.g. the keto group, the ether group, the ester group or the amide group, this group or these groups being attached as substituent(s) to a hydrocarbon ring or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g., kieselguhr, talc, clay or fertilizers.

EXAMPLE 15

The active ingredients are added to a nutrient solution ideally suited for promoting the growth of the fungus *Aspergillus niger* in amounts of 100, 50, 25 and 10 parts per million parts of nutrient solution. 20 ml. of the nutrient solutions treated in this manner is placed in 100 ml. Erlenmeyer flasks and inoculated with 0.3 mg. of spores of the fungus *Aspergillus niger*. The flasks are then heated at 36° C. for 120 hours; subsequently, the extent of the fungus development—mainly on the surface of the nutrient solutions—is assessed.

| Name | | Amount of active ingredient in parts per million parts of nutrient solution— | | | |
|---|---|---|---|---|---|
| | | 100 | 50 | 25 | 10 |
| Active ingredient from Ex. No.: | | | | | |
| 5 | 2,4-bis-(N,N-dichloroamino)-6-chloro-s-triazine. | 0 | 0 | 0 | 2 |
| 4 | 2,4-bis-(N,N-dichloroamino)-6-methoxy-s-triazine. | 0 | 0 | 0 | 2 |
| 1 | 2,4-bis-(N,N-dichloroamino)-6-methyl-s-triazine. | 0 | 0 | 0 | 2 |
| 2 | 2,4-bis-(N,N-dichloroamino)-6-phenyl-s-triazine. | 0 | 0 | 0 | 4 |
| 9 | 2,4-bis-(N,N-dibromoamino)-6-methyl-s-triazine. | 0 | 0 | 0 | 0 |
| 10 | 2,4-bis-(N,N-dibromoamino)-6-methoxy-s-triazine. | 0 | 0 | 0 | 0 |
| 11 | 2-(N,N-dibromoamino)-4-chloro-6-ethylamino-s-triazine. | 0 | 0 | 0 | 4 |
| 13 | 2-(N,N-dibromoamino)-4,6-bis-methoxy-s-triazine. | 0 | 1 | 3 | 3 |
| 14 | 2,4,6-tris-(N,N-dibromoamino)-s-triazine. | 0 | 0 | 0 | 0 |
| Comparative agent: TMTD | | 1 | 2 | 4 | 5 |
| Control (untreated) | | | | | 5 |

NOTE.—0=no fungus growth; graded down to 5=uncontrolled fungus growth (surface of nutrient solution completely covered by fungus).

EXAMPLE 16

70 parts by weight of the compound of Example 1 is mixed with 30 parts by weight of N-methyl-α-pyrrolidone. A mixture is obtained which is suitable for application in the form of very fine drops.

EXAMPLE 17

20 parts by weight of the compound of Example 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 18

20 parts by weight of the compound of Example 3 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 19

20 parts by weight of the compound of Example 4 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 20

20 parts by weight of the compound of Example 5 is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 21

3 parts by weight of the compound of Example 6 is intimately mixed with 97 parts by weight of particulate kaolin. A dust is obtained containing 3% by weight of the active ingredient.

EXAMPLE 22

30 parts by weight of the compound of Example 7 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A triazine derivative of the formula

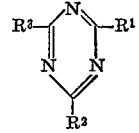

where $R^1$, $R^2$ and $R^3$ each is N,N-dichloroamino or N,N-dibromoamino, $R^2$ and $R^3$ may further each be lower alkyl, phenyl, methoxy, chloro or the radical

wherein A is ethyl, chloroethyl or hydrogen and B is ethyl or chloroethyl.

2. 2,4-bis-(N,N-dibromoamino)-6-ethyl-s-triazine.
3. 2,4,6-tris-(N,N-dibromoamino)-s-triazine.

References Cited

UNITED STATES PATENTS 3,251,760  5/1966  Holtschmidt et al. _ 260—249.8 X

JOHN M. FORD, Primary Examiner

U.S. Cl. X.R.

260—249.5, 249.9, 249.8; 424—249